G. F. MOORE.
Machine for Molding and Shaping Counter-Stiffeners
for Boots and Shoes.

No. 218,763. Patented Aug. 19, 1879.

Witnesses.

Inventor.
George F. Moore
by his attorney

UNITED STATES PATENT OFFICE.

GEORGE F. MOORE, OF KENNEBUNK, MAINE, ASSIGNOR TO MOUSAM MANUFACTURING COMPANY, OF SAME PLACE.

IMPROVEMENT IN MACHINES FOR MOLDING AND SHAPING COUNTER-STIFFENERS FOR BOOTS AND SHOES.

Specification forming part of Letters Patent No. 218,763, dated August 19, 1879; application filed September 25, 1878.

*To all whom it may concern:*

Be it known that I, GEORGE F. MOORE, of Kennebunk, of the county of York and State of Maine, have invented a new and useful Improvement in Machinery for Molding or Shaping Counters or Heel-Stiffeners for Boots or Shoes; and do hereby declare the same to be described in the following specification and represented in the accompanying drawings, of which—

Figure 1:
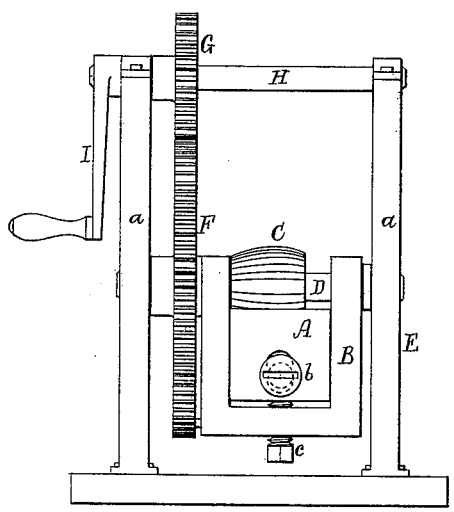
Figure 3:
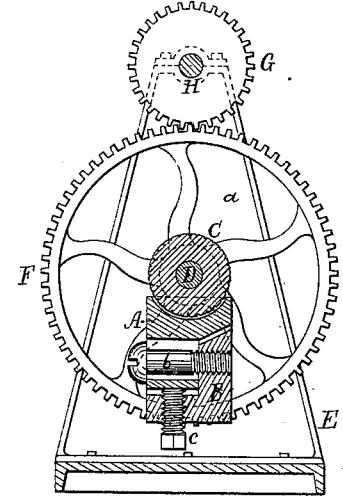
Figure 2:
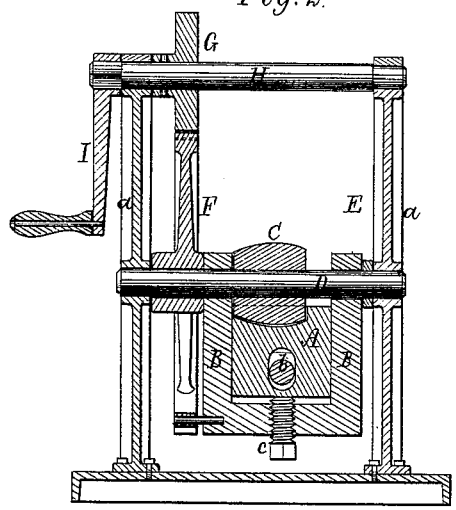

Figure 1 is a front elevation, Fig. 2 a longitudinal section, and Fig. 3 a transverse section, of a machine embodying my improvement or invention.

In carrying out my present invention I make use of a stationary former, which in shape is a truncated ovoid, or is analogous thereto, and with such I employ an adjustable mold whose molding recess or chamber is concave transversely and longitudinally in correspondence with or about with the convexity of the part of the former arranged within it, and I combine with the said mold a rotary carrier and mechanism for revolving such mold and carrier around the said former transversely, while the said former is stationary.

In Letters Patent No. 198,550, granted to me December 25, 1877, I describe a counter-shaping machine having to its ovoidal former a single blade, and mechanism for revolving either about the axis of the said former, and in such patent I referred to a counter-molding machine having an ovated former and a concave mold, the latter being extended about half-way around such former transversely of it; but by such machine was meant that known in the arts as the "Coté" machine for molding counters, the ovated former of which only was revoluble within the mold.

In my present machine I do not employ a blade curved at its edge in parallelism with the lengthwise curve of the ovated former, but I employ a mold whose molding-chamber is concave both transversely and longitudinally, such mold being shown in the drawings at A as arranged in a bell-crank-shaped carrier, B, and directly under the truncated ovoid or former C, which is fixed on a stationary shaft, D, supported in standards $a\,a$ of a frame, E.

The carrier B is pivoted on the shaft D, so as to be capable of being revolved thereon about it and the former C, and such mold is supported in the carrier by a clamp-screw, $b$, and an adjusting-screw, $c$, arranged as represented.

Furthermore, there is fixed to the carrier a gear, F, concentrically with and loosely on the shaft D, such gear engaging with a pinion, G, carried by a shaft, H, provided with a crank, I, or other suitable means of revolving it.

To use the machine, a counter-blank is to be laid transversely on the ovated former when the mold is beneath such former.

While the mold may be directly over the said former it will force the blank into close contact with it and the inner surface of the mold-chamber, and will hold the blank from curling on the former and will shape the blank much better than will a single blade working around such former.

Should the same be needed, there may be to the mold a yielding or elastic bed, which may be arranged in the carrier.

With the blade but a small portion of the blank is acted on at any time while the blade may be in operation, and consequently the blank is held in place only between the blade and the frame, and is liable to slip therein; but with a mold as described the whole or a large portion of the blank is usually being pressed and drawn against the former while the mold is in motion over such former. The blank is thus not only more thoroughly acted on by a mold, but is prevented thereby from slipping on the former.

By having the mold revolve around a stationary former, instead of having the mold stationary and the former revoluble thereon, advantage is gained in manipulating the blank or applying it to the former, as on account of the former being at rest the blank can be applied to it easier and better than when such former may be in revolution.

The aforesaid mechanism of Coté, the patent for which was numbered 147,906 and dated February 24, 1874, and reissued June 2, 1874, and October 24, 1876, being an invention prior to that hereinbefore described, is not to be supposed to be claimed by me, my present invention involving additions to it, whereby the former is made stationary, and the concave and adjustable mold is supported and rendered capable of being revolved about the said former.

I claim as my invention—

A boot or shoe counter or stiffener molding machine, essentially as described, composed of a stationary convex or ovated former, a mold adjustable toward or from the axial line of the former, and curved in its molding-chamber both transversely and longitudinally, a rotary carrier for such mold, and mechanism for revolving the said carrier and mold transversely about the stationary convex former, all being substantially as set forth.

GEORGE F. MOORE.

Witnesses:
CHARLES W. GOODNOW,
ADDISON E. HALEY.